US010319035B2

(12) United States Patent
Nelson et al.

(10) Patent No.: US 10,319,035 B2
(45) Date of Patent: Jun. 11, 2019

(54) IMAGE CAPTURING AND AUTOMATIC LABELING SYSTEM

(71) Applicant: CCC INFORMATION SERVICES, Chicago, IL (US)

(72) Inventors: Ronald Nelson, Cerritos, CA (US); Sean Fitzgerald, Cerritos, CA (US)

(73) Assignee: CCC INFORMATION SERVICES, Chicago, IL (US)

( * ) Notice: Subject to any disclaimer, the term of this patent is extended or adjusted under 35 U.S.C. 154(b) by 586 days.

(21) Appl. No.: 14/052,629

(22) Filed: Oct. 11, 2013

(65) Prior Publication Data

US 2015/0103170 A1    Apr. 16, 2015

(51) Int. Cl.
| | |
|---|---|
| *H04N 1/00* | (2006.01) |
| *H04N 1/32* | (2006.01) |
| *H04N 7/18* | (2006.01) |
| *G06F 17/28* | (2006.01) |
| *G06Q 10/00* | (2012.01) |
| *G06Q 40/08* | (2012.01) |

(52) U.S. Cl.
CPC ......... *G06Q 40/08* (2013.01); *G06F 17/2854* (2013.01); *G06Q 10/20* (2013.01); *H04N 1/00209* (2013.01); *H04N 1/32128* (2013.01); *H04N 7/181* (2013.01); *H04N 2201/0084* (2013.01); *H04N 2201/3205* (2013.01)

(58) Field of Classification Search
None
See application file for complete search history.

(56) References Cited

U.S. PATENT DOCUMENTS

| | | |
|---|---|---|
| 6,389,387 B1 | 5/2002 | Poznanski et al. |
| 6,504,951 B1 | 1/2003 | Luo et al. |
| 6,512,846 B1 | 1/2003 | Luo |
| 6,741,655 B1 | 5/2004 | Chang et al. |
| 6,912,298 B1 | 6/2005 | Wilensky |

(Continued)

OTHER PUBLICATIONS

International Search Reportn and Written Opinion for Application No. PCT/US14/59665, dated Apr. 22, 2015.

(Continued)

*Primary Examiner* — Edemio Navas, Jr.
*Assistant Examiner* — William Adrovel
(74) *Attorney, Agent, or Firm* — Marshall, Gerstein & Borun LLP

(57) ABSTRACT

A vehicle image capture and labeling system operates to enable a user to capture vehicle photos, pictures, and/or images that are automatically labeled, i.e., annotated. In particular, the captured vehicle photos, pictures, or images are automatically labeled with certain vehicle identifier information, like a vehicle identification number (VIN), and pose information, that identifies a portion or view of the vehicle depicted within the image of the vehicle. The vehicle images may also be automatically labeled with one or more other image attributes or indicia, such as geospatial information corresponding to a location at which the photo or image was captured (e.g., global positioning system (GPS) data), time and date of image capture data, etc. The captured vehicle image and its label(s) may then be stored and used by other applications such as vehicle insurance claim applications, automobile repair estimate applications, etc.

39 Claims, 7 Drawing Sheets

(56) References Cited

U.S. PATENT DOCUMENTS

| | | |
|---|---|---|
| 6,956,587 B1 | 10/2005 | Anson |
| 6,970,860 B1 | 11/2005 | Liu et al. |
| 7,035,461 B2 | 4/2006 | Luo et al. |
| 7,062,085 B2 | 6/2006 | Luo et al. |
| 7,068,309 B2 | 6/2006 | Toyama et al. |
| 7,092,573 B2 | 8/2006 | Luo et al. |
| 7,336,819 B2 | 2/2008 | Gallagher et al. |
| 7,349,895 B2 | 3/2008 | Liu et al. |
| 7,394,947 B2 | 7/2008 | Li et al. |
| 7,466,845 B2 | 12/2008 | Bhaskaran et al. |
| 7,499,916 B2 | 3/2009 | Liu et al. |
| 7,508,419 B2 | 3/2009 | Toyama et al. |
| 7,515,754 B2 | 4/2009 | Hung |
| 7,529,732 B2 | 5/2009 | Liu et al. |
| 7,576,755 B2 | 8/2009 | Sun et al. |
| 7,587,101 B1 | 9/2009 | Bourdev |
| 7,610,260 B2 | 10/2009 | Asukai et al. |
| 7,627,556 B2 | 12/2009 | Liu et al. |
| 7,664,322 B1 | 2/2010 | Wilensky |
| 7,668,867 B2 | 2/2010 | Morris et al. |
| 7,698,332 B2 | 4/2010 | Liu et al. |
| 7,738,700 B2 | 6/2010 | Shiiyama |
| 7,814,040 B1 | 10/2010 | Zhang et al. |
| 7,877,385 B2 | 1/2011 | Craswell et al. |
| 7,889,946 B1 | 2/2011 | Bourdev |
| 7,890,512 B2 | 2/2011 | Mei et al. |
| 7,941,009 B2 | 5/2011 | Li et al. |
| 7,958,068 B2 | 6/2011 | Smith et al. |
| 7,986,842 B2 | 7/2011 | Cooper |
| 8,059,891 B2 | 11/2011 | Li et al. |
| 8,065,313 B2 | 11/2011 | Yagnik |
| 8,068,677 B2 | 11/2011 | Varadarajan et al. |
| 8,094,948 B2 | 1/2012 | Jain et al. |
| 8,126,274 B2 | 2/2012 | Li et al. |
| 8,131,086 B2 | 3/2012 | Hua et al. |
| 8,150,170 B2 | 4/2012 | Li et al. |
| 8,155,406 B2 | 4/2012 | Mattiuzzi |
| 8,165,410 B2 | 4/2012 | Perronnin |
| 8,170,280 B2 | 5/2012 | Zhao et al. |
| 8,170,343 B2 | 5/2012 | Chien |
| 8,171,043 B2 | 5/2012 | Murdock et al. |
| 8,171,049 B2 | 5/2012 | Ah-Pine et al. |
| 8,185,526 B2 | 5/2012 | Wen et al. |
| 8,189,880 B2 | 5/2012 | Wen et al. |
| 8,190,604 B2 | 5/2012 | Wen et al. |
| 8,194,986 B2 | 6/2012 | Conwell |
| 8,204,838 B2 | 6/2012 | Schwaighofer et al. |
| 8,204,842 B1 | 6/2012 | Zhang et al. |
| 8,214,813 B2 | 7/2012 | Harris et al. |
| 8,229,865 B2 | 7/2012 | Campbell et al. |
| 8,232,996 B2 | 7/2012 | Bailloeul et al. |
| 8,239,333 B2 | 8/2012 | Yang et al. |
| 8,244,069 B1 | 8/2012 | Bourdev |
| 8,311,344 B2 | 11/2012 | Dunlop et al. |
| 8,311,390 B2 | 11/2012 | Berry |
| 8,316,000 B2 | 11/2012 | Srivastava et al. |
| 8,321,424 B2 | 11/2012 | Li et al. |
| 8,325,999 B2 | 12/2012 | Kapoor et al. |
| 8,340,438 B2 | 12/2012 | Anderson |
| 8,341,112 B2 | 12/2012 | Zhang et al. |
| 8,346,800 B2 | 1/2013 | Szummer et al. |
| 8,347,206 B2 | 1/2013 | Gear et al. |
| 8,351,661 B2 | 1/2013 | Begeja et al. |
| 8,364,673 B2 | 1/2013 | Chang et al. |
| 8,370,869 B2 | 2/2013 | Paek et al. |
| 8,375,032 B2 | 2/2013 | Birdwell et al. |
| 8,380,045 B2 | 2/2013 | Berry et al. |
| 8,385,971 B2 | 2/2013 | Rhoads et al. |
| 8,396,870 B2 | 3/2013 | Birdwell et al. |
| 8,422,832 B2 | 4/2013 | Makadia et al. |
| 8,423,485 B2 | 4/2013 | Harada et al. |
| 8,429,103 B1 | 4/2013 | Aradhye et al. |
| 8,429,153 B2 | 4/2013 | Birdwell et al. |
| 8,437,514 B2 | 5/2013 | Wen et al. |
| 8,447,767 B2 | 5/2013 | Ah-Pine et al. |
| 8,452,794 B2 | 5/2013 | Yang et al. |
| 8,457,416 B2 | 6/2013 | Liu et al. |
| 8,463,045 B2 | 6/2013 | Yang et al. |
| 8,463,768 B2 | 6/2013 | Srivastava et al. |
| 8,483,715 B2 | 7/2013 | Chen |
| 8,488,682 B2 | 7/2013 | Chang et al. |
| 8,488,881 B2 | 7/2013 | Feris et al. |
| 8,495,057 B2 | 7/2013 | Palermiti, II et al. |
| 8,503,791 B2 | 8/2013 | Conwell |
| 8,510,238 B1 | 8/2013 | Aradhye et al. |
| 8,520,979 B2 | 8/2013 | Conwell |
| 8,532,377 B2 | 9/2013 | Skaff et al. |
| 8,538,173 B2 | 9/2013 | Fukui et al. |
| 8,538,896 B2 | 9/2013 | Mensink et al. |
| 2003/0053686 A1 | 3/2003 | Luo et al. |
| 2003/0108250 A1 | 6/2003 | Luo et al. |
| 2004/0037460 A1 | 2/2004 | Luo et al. |
| 2004/0070678 A1 | 4/2004 | Toyama et al. |
| 2004/0225686 A1 | 11/2004 | Li et al. |
| 2005/0010553 A1 | 1/2005 | Liu |
| 2005/0114325 A1 | 5/2005 | Liu et al. |
| 2005/0147298 A1 | 7/2005 | Gallagher et al. |
| 2005/0190273 A1 | 9/2005 | Toyama et al. |
| 2006/0107297 A1 | 5/2006 | Toyama et al. |
| 2006/0161543 A1 | 7/2006 | Feng et al. |
| 2006/0274171 A1* | 12/2006 | Wang .................. G06K 7/14 348/294 |
| 2007/0250232 A1 | 10/2007 | Dourney et al. |
| 2007/0263266 A1 | 11/2007 | Har'el et al. |
| 2007/0293997 A1* | 12/2007 | Couch .................. G01M 17/00 701/31.4 |
| 2008/0021928 A1 | 1/2008 | Yagnik |
| 2008/0285860 A1 | 11/2008 | Datta et al. |
| 2008/0292196 A1 | 11/2008 | Jain et al. |
| 2009/0076800 A1 | 3/2009 | Li et al. |
| 2009/0083332 A1 | 3/2009 | Datta et al. |
| 2009/0169097 A1 | 7/2009 | Li et al. |
| 2009/0204637 A1 | 8/2009 | Li et al. |
| 2009/0208054 A1* | 8/2009 | Angell ............... G06K 9/00771 382/103 |
| 2009/0208106 A1 | 8/2009 | Dunlop et al. |
| 2009/0234810 A1* | 9/2009 | Angell .................. G06Q 10/04 |
| 2009/0240695 A1* | 9/2009 | Angell ............. G06F 17/30781 |
| 2009/0240735 A1* | 9/2009 | Grandhi ................. G06Q 30/02 |
| 2009/0297050 A1 | 12/2009 | Li et al. |
| 2009/0304272 A1 | 12/2009 | Makadia et al. |
| 2009/0313294 A1 | 12/2009 | Mei et al. |
| 2010/0046842 A1 | 2/2010 | Conwell |
| 2010/0048242 A1 | 2/2010 | Rhoads et al. |
| 2010/0076976 A1 | 3/2010 | Sotirov et al. |
| 2010/0138422 A1 | 6/2010 | Mattiuzzi |
| 2010/0189354 A1 | 7/2010 | de Campos et al. |
| 2010/0226582 A1 | 9/2010 | Luo et al. |
| 2010/0250136 A1 | 9/2010 | Chen |
| 2011/0034176 A1 | 2/2011 | Lord et al. |
| 2011/0044512 A1 | 2/2011 | Bambha et al. |
| 2011/0055266 A1 | 3/2011 | Varadarajan et al. |
| 2011/0143811 A1 | 6/2011 | Rodriguez |
| 2011/0173141 A1 | 7/2011 | Campbell et al. |
| 2011/0212717 A1 | 9/2011 | Rhoads et al. |
| 2011/0280447 A1 | 11/2011 | Conwell |
| 2012/0054130 A1 | 3/2012 | Mensink et al. |
| 2012/0114199 A1 | 5/2012 | Panyam et al. |
| 2012/0114249 A1 | 5/2012 | Conwell |
| 2012/0130872 A1* | 5/2012 | Baughman ............. G07B 15/02 705/32 |
| 2012/0131026 A1 | 5/2012 | Benhadda et al. |
| 2012/0155774 A1 | 6/2012 | Li et al. |
| 2012/0158739 A1 | 6/2012 | Ah-Pine et al. |
| 2012/0190404 A1 | 7/2012 | Rhoads |
| 2012/0258776 A1 | 10/2012 | Lord et al. |
| 2012/0269436 A1 | 10/2012 | Mensink et al. |
| 2013/0011062 A1 | 1/2013 | Conwell et al. |
| 2013/0011070 A1 | 1/2013 | Datta et al. |
| 2013/0063613 A1 | 3/2013 | Conwell |
| 2013/0144863 A1 | 6/2013 | Mayer et al. |
| 2013/0170738 A1 | 7/2013 | Capuozzo et al. |
| 2013/0198601 A1 | 8/2013 | Makadia et al. |
| 2013/0217440 A1 | 8/2013 | Lord et al. |

(56) References Cited

U.S. PATENT DOCUMENTS

2013/0345896 A1* 12/2013 Blumer .............. G06K 9/00624
701/1
2015/0100201 A1* 4/2015 Alexandre ............ B64F 5/0045
701/33.2
2017/0109949 A1* 4/2017 Blumer ................ G07C 5/0866

OTHER PUBLICATIONS

Automatic Image Annotation, http://lcav.epfl.ch/research/automatic_image_annotation, accessed Oct. 7, 2013.
CS 9300, http://www.carestreamdental.com/pages/cs9300/index.htm, accessed Oct. 7, 2013.
International Preliminary Report on Patentability, International Application No. PCT/US2014/059665, dated Apr. 12, 2016.

* cited by examiner

IMAGE CAPTURING AND AUTOMATIC LABELING SYSTEM

FIELD OF THE INVENTION

The present disclosure relates generally to a system and method for capturing and labeling images. More particularly, the present disclosure relates to a system and method that captures and automatically labels images with identity information and with image pose or image attribute data to enable better processing of the images in conjunction with one or more applications such as repair estimate and insurance claim applications.

BACKGROUND

There are many situations in which photographs or videos are taken and are used as an aid to documenting or providing information related to specific business functions or applications, such as in performing automobile repair estimates, determining automobile insurance claim settlements, in making real estate sales promotional materials, performing remote or out-patient medical diagnosis and treatments, etc. In many cases, the number of photographs or images that are or that need to be collected can be quite large, and the handling of these photographs can become tedious and time consuming because each of the photographs needs to be labeled or annotated with other information that is ultimately used as part of the business application to properly analyze the photograph.

For example, generating automobile repair estimates (either as part of a repair estimate process or as part of an insurance claim settlement) usually involves an adjustor traveling to a damaged vehicle, wherever it is located, and documenting the damage to the vehicle to enable a repair estimate to be generated or an insurance claim to be processed. A typical part of this documentation process involves the adjustor taking various images or photographs of the vehicle and, in particular, of the damaged portions of the vehicle, using a camera device. These photographs are then later uploaded to a computer device, such as to a database or to a hard drive on a personal computer, where the adjustor manually labels the photos with information indicating, for example, the portion of the vehicle depicted in the photo (also referred to herein as the image pose) and the some vehicle identification (such as a vehicle identification number or VIN, a make, model and year of the vehicle, a license number of the vehicle, etc.) that is needed to document the identity of the vehicle depicted in the photographs or videos. Typically, this photograph or video saving and documentation process also requires the adjustor to record the date and time that the photo, image or video was taken, stored to the database, and/or labeled with the additional data.

However, in a typical day, an adjustor may take multiple photographs of numerous vehicles and may not download or transfer the pictures until the end of the after all of the pictures have been taken. However, the pictures may remain on the camera device for days or weeks. As a result, it is easy for the adjustor to lose track of which photographs go with which vehicle identifier, and in some cases, may not be able to tell which set of photographs are associated with the same vehicle. For example, the adjustor may not be able to tell to which of a series of vehicles for which pictures were taken by the camera that a photograph of an odometer reading or a license plate belongs. Still further, this labeling process may take the adjustor tens of seconds to a couple of minutes for each photo or each group of photos, adding to the time it takes the adjustor to document the damage to the vehicle. Still further, when documenting vehicle photos, different adjustors typically annotate the photos with slightly or sometimes significantly different labeling text or abbreviations, which are not common across the industry. Thus, it may be difficult for another person viewing the photograph at a different time to actually determine the labeling information of a photograph. This inconsistent labeling leads to confusion and poor documentation, slowing down the repair or insurance claim settlement process.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A vehicle image capture and labeling system operates to enable a user to capture vehicle photos, pictures, and/or images that are automatically labeled, i.e., annotated. Generally, the terms "photo," "picture" and "image" are used interchangeably herein to refer to a representation of an object (e.g., of a vehicle or portion thereof) that is able to be visually presented on a screen, paper or other surface. The photo, picture or image may be stationary (e.g., still or static), or the photo, picture or image may be dynamic (e.g., a video or film clip). Typically, a photo, picture or image is captured (e.g., in a digital or other computer-readable format) by an image capturing device such as a camera.

The captured vehicle photos, pictures, or images are automatically labeled with certain vehicle information or vehicle identifier information, like a vehicle identification number (VIN) and a label identifying a portion or view of the vehicle depicted within the image, e.g., a "pose" or a "view" of the vehicle. In some cases, the vehicle images are automatically labeled with one or more other image attributes or indicia, such as geospatial information corresponding to a location at which the photo or image was captured (e.g., global positioning system (GPS) data), time and date of image capture data, etc. The captured vehicle image and its label(s) may be used by other applications such as vehicle insurance claim applications, automobile repair estimate applications, etc.

In one case, the vehicle image capture and labeling system may be implemented as an application executed by a processor of a computing device that has or is connected to a digital camera. In this case, the computing device may be, for example, a mobile phone, a mobile computer such as a tablet computer device, a specialized camera device, etc.

The application may include a first routine that prompts a user to identify the vehicle for which photos are being taken and, in one case, may enable the user to supply information indicating the VIN of the vehicle. As an example, the user may be prompted to enter the VIN of the vehicle in one or more data entry fields presented by the application, or the user may be prompted to scan or take a picture of the VIN plate or other portion of the vehicle that indicates the VIN or other unique identifier of the vehicle. In these later cases, the application may process the image information or scanned data to decode or identify the VIN or other unique identifier of the vehicle to thereby determine a unique vehicle identifier for use in labeling photos of the vehicle.

Thereafter, the application may present a user, on a display screen of the computing device, a series of user controls in the form of, for example, selection icons, indicating one or more portions of the vehicle for which a photo or image is to be captured and labeled. The user controls may include, for example, controls or icons associated with exterior views of the vehicle such as an exterior vehicle front view, a right front corner view, one or more right side views, a right rear corner view, a rear view, a left rear corner view, one or more left side views, a left front corner view, etc. Additionally, the user controls may include icons associated with other portions of the vehicle such as an odometer view, a VIN view, an oil change sticker information view, one or more interior views, an engine view, a trunk view, etc. Each control or icon may include a respective pre-assigned identifier corresponding to the particular portion, view or pose of the vehicle, which may be stored as metadata (or stored in some other computer-readable format or syntax) in connection with the control or icon. If desired, for ease of use, the user controls or selection icons may each include (e.g., may display or present) a natural language translation of the pre-assigned identifier of the respective portion of the vehicle, but the user controls or selection icons could be associated with the different portions of the vehicle in other manners, such as by being located near or on a graphic depicting a generic view of a vehicle, such as a top view of a vehicle. Additionally, while user controls may be depicted on the display screen of the user interface device of the computing device as icons, these controls may be provide in any other manner, such as using drop-down menus, pop-up blocks initiated by a cursor hover action over a portion of the screen or display, etc. For example, the user controls may be presented and implemented via voice activation. In some implementations of voice activation, the different user controls may not be displayed as different icons on the screen but may be activated by a setting indicated on the screen that the use of a voice command will initiate a user control. In this case, the computing device detects and performs voice activation processing on a verbal or spoken command and uses the recognized command to determine the user control being activated.

Generally speaking, the application enables the user to select or initiate one of the user controls to indicate that a photo or image is to be captured of the view, pose or portion of the vehicle associated with the user control. The application may detect a user selection of a user control by, for example, detecting when the user taps or touches a selection icon when the selection icon is displayed on a touch screen display or otherwise when the user selects the icon via any user input mechanism including voice activation. After detecting a user selection of one of the selection icons or other user controls, the application provides the user with a camera interface that enables the user to take a picture, image, video or photo, preferably of the area or portion of the vehicle associated with the user control or selection icon that the user just selected. The user may then use the camera interface in any standard manner to take a picture, image, video, or photo (purportedly of the portion of the vehicle associated with the user control). When the user takes the picture, photo or video, the picture, photo or video is electronically captured and is stored in a memory of the computing device along with certain other image attribute data for the picture, for example, as metadata or as a separate folder or attachment associated with the image. Thus, the image attribute data may be encoded into the image or video file itself, or the image attribute data could be created as a separate file or data structure and associated with the image or video file as an external file. The image attribute data of an image may include, for example, vehicle identification data. The vehicle identification data may include, for example, the VIN or other vehicle identification information of the vehicle (such as a make, model and year determined based on the VIN or by other means) as previously determined or obtained by the application. Other image attribute data may include, for example, the pre-assigned identifier indicative of the portion of the vehicle associated with the user control that was selected prior to taking the photo or image to indicate, for example, the view of the vehicle within the photo. This image attribute data may, for example, indicate that the photo is of the right front corner of the vehicle, the side of the vehicle, the odometer of the vehicle, etc. based on the pre-assigned identifier associated with the user control that was used to initiate the taking of the photo. This type of image attribute data may be encoded in some manner, or may be textual or natural language data indicating one of a plurality of possible views of the vehicle. In addition, the image attribute data may include the date and time that the photo or image was taken or captured (which is generally provided by a clock associated with the camera or the computing device in which the camera is located when the picture is taken), a geospatial position of the camera when the photo was taken, such as a set of GPS coordinates (which may be captured by a GPS device within the camera or mobile computing device), etc.

The image capture and labeling system may enable the user to sequentially select others of the user controls and take photos, videos or images based on the selection of those user controls, until the user has captured all of the images the user deems necessary for one or more other applications or uses for the photos, videos or images. Image attribute data or labels for each of the captured images (and in some cases, natural language translations of the image attribute data) are automatically generated based on the user control selected by the user. In some cases, the image capture and labeling system may enable the user to enter new labeling information to define or characterize a captured image that is not one of the pre-established poses or views presented by or associated with the user controls.

In any event, after the photos are captured, the image capture and labeling system may compress or otherwise process the captured images to reduce the memory size of the images to, for example, reduce a 14 megapixel photo to a size that can be stored in 40 kilobytes of memory. Likewise, the image capture and labeling system may then create an image package or an image file that includes the image (or the reduced-in-size image) and image attribute data, including the vehicle identifier data and the other image attribute or labeling data. In this case, each image may include separate vehicle identifier and image attribute data, or each image may include image attribute or labeling data unique to that photo (such as date/time of capture data), while the package includes image attribute or labeling data that is common to all of the images, such as vehicle identification data. The image capture and labeling system may then send or transmit these images or an image package or file to one or more other applications or databases via a communication network, such as the public Internet, other public networks, and/or private communications networks. The labeled images or image packages may be sent to and stored at one or more databases or data storage entities which may store the image packages for access by one or more other applications, such as vehicle repair estimate applications, vehicle insurance claim applications, etc. The system may further include one or more servers or computing devices coupled to the one or more data storage entities to provide the labeled images or image packages to other applications as they are needed by these applications. These further applications may use the images and the labeling or image attribute data to enable users of those applications, for example, to estimate repair costs for repairing damage to the vehicle depicted in the images, to create or process an insurance claim associated with the damage to the vehicle depicted in the images, etc.

As will be understood, the vehicle image capture and labeling system described herein automatically creates and associates image attribute or labeling data such as vehicle identification data, image view or pose identification data, location and time data, GPS data, vehicle view data, etc., for each image or each set of image s when capturing the images, which significantly reduces the time and effort it takes the person taking the photos or images to document and label the images for other uses, such as for use in repair estimates and insurance claim processing uses. In fact, the photo or image taker only has to capture some vehicle identification information for a vehicle in conjunction with using the user controls to take desired photos of the vehicle, so as to be able to uniquely and properly label any image associated with any of the pre-established user controls. Moreover, in some cases, the image capture and labeling system can enable the photo taker to capture the vehicle information by taking a picture or a scan of a VIN plate or other encoded vehicle identifier and thereby enables the photo taker to properly label or document each of the photos without having to manually enter or type in any textual information into the system. This feature, in turn, significantly reduces the amount of time it takes the photo taker to document the vehicle and, for example, damage to the vehicle, for other uses.

Still further, the automatic labeling features implemented by the image capture and labeling system described herein provides for consistent labeling or coding of vehicle image images of various different vehicles, and thus enables applications that use these photo downstream or after the image capture process to perform advanced processing on the images as part of those applications. For example, an insurance claim processing application can automatically process the labeling data of the photos for a particular vehicle to assure that a vehicle photo exists for each of a set of poses that are deemed necessary to process a claim. This application can immediately flag or reject claims that do not have the correct photos associated therewith, which then results in faster and better claim processing.

DETAILED DESCRIPTION

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents. As used herein, the term "vehicle" may refer to a car, an automobile, a motorcycle, a truck, a recreational vehicle, a van, a bus, a boat or other amphibious vessel, heavy equipment, or any other insurable mode of transportation.

Figure 1:
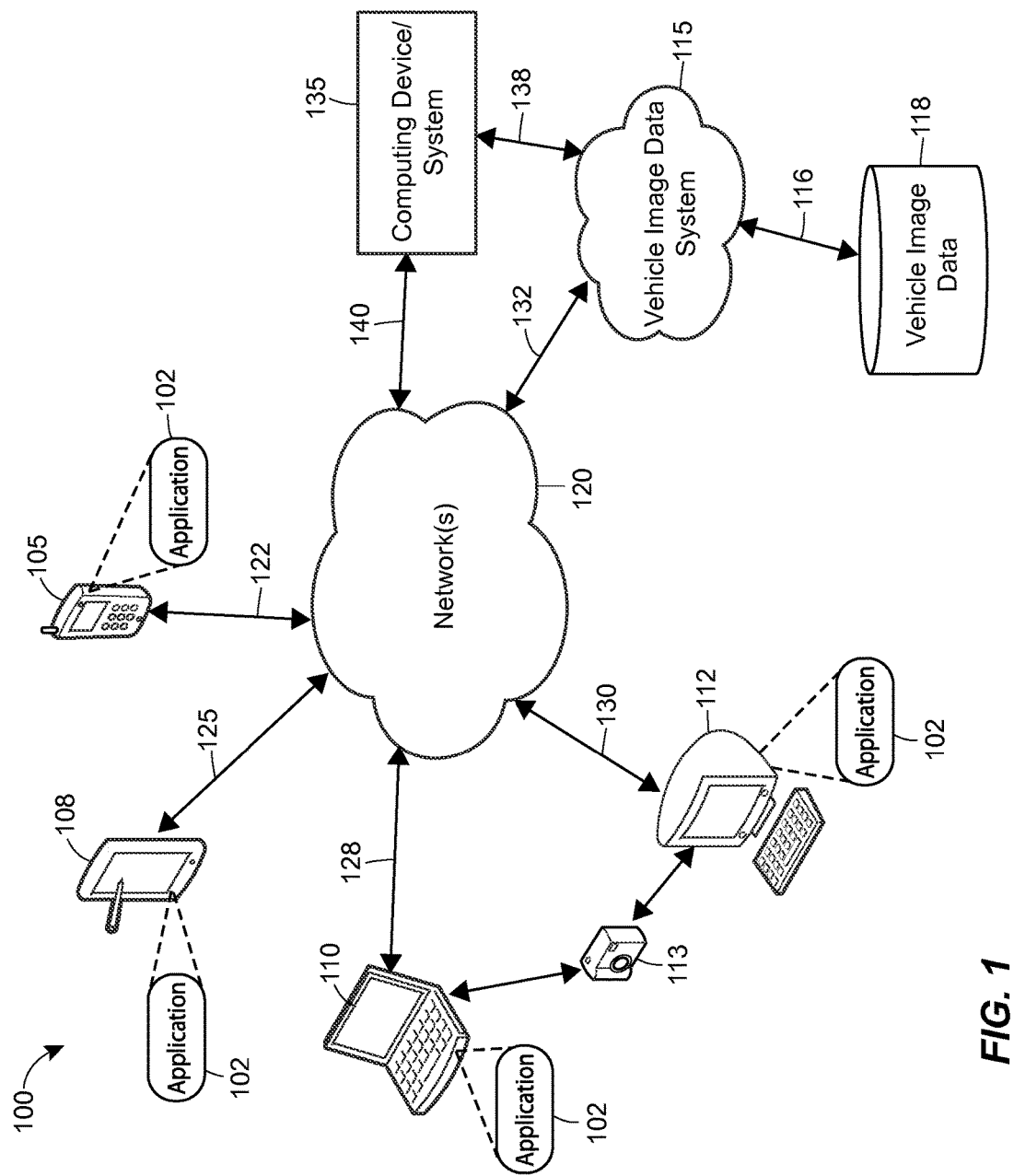
FIG. 1 is a block diagram of an exemplary system for capturing and automatically labeling an image of a vehicle.

FIG. 1 is a block diagram of an exemplary system 100 for capturing and labeling an image of a vehicle. The system 100 includes one or more instances of an application 102 for capturing and labeling an image of a vehicle (e.g., a vehicle image and label application 102) that is resident on a computing device, such as a mobile phone or smart device 105, a tablet computing device 108, a laptop or portable computing device 110, or a stationary computing device 112. In some cases, a computing device on which an instance of the application 102 resides (e.g., the device 105 or the device 108) includes an integral image capturing device or apparatus via which vehicle images are captured, such as a built-in camera. Some computing devices including respective instances of the application 102 (e.g., the device 112) are configured to communicatively connect with an external image capturing device 113, such as a stand-alone digital camera or other image capturing device. Some computing devices including respective instances of the application 102 (e.g., the device 110) include both an integral image capturing apparatus (not shown) and an interface via which a connection to an external image capturing device 113 is able to be established.

The application 102 is in communicative connection to a vehicle image data system 115, which may include one or more network computing devices. The vehicle image data system 115 may be a single computing device or server, the vehicle image data system 115 may include multiple computing devices or servers, or the vehicle image data system 115 may be a computing cloud or some other suitable configuration of one or more computing devices. In an embodiment, the application 102 uses one or more networks 120 (which are described in more detail below) to communicatively connect with the image data system 115.

The vehicle image data system 115 is in communicative connection 116 with a vehicle image data storage entity 118 configured to store vehicle image data received from a plurality of sources or computing devices. The communicative connection or link 116 may be as simple as a memory access function, or the communicative connection or link 116 may be a wired, wireless, or multi-stage connection through the one or more networks 120 or one or more other networks (not shown). The vehicle image data storage entity 118 includes one or more data storage devices, and may use any suitable database or schema for storing vehicle image data thereon. In an embodiment, the vehicle image data storage entity 118 is included in the vehicle image data system 115. Moreover, the data storage entity 118 may be part of a data system set up by and implemented by a particular user of the photos, such as an insurance company or a repair company, or may be part of a network set up and run by third party entity that provides support to these or other companies. In the later case, the photos and labeling data may be accessible to multiple users via the database 118, such consumers or vehicle owners, repair shops, insurance companies, etc. Thus, the database 118 may be connected via any desired wired or wireless communication network to other users of the photos for any number of reasons, such as for completing or settling an insurance claim, making a repair estimate, viewing the automobile, etc.

The one or more networks 120 may include one or more private communications networks, such as a virtual private network or a secured local area network. Additionally or alternatively, the one or more networks 120 may include one or more public communication networks, such as a Wi-Fi hotspot or the Internet. The network(s) 120 may utilize any wired and/or wireless communication technology or technologies. For example, the one or more network(s) 120 may include a broadband packet network, an IEEE 802.11 compliant network, and/or an out-of-band signaling network. In FIG. 1, the mobile computing devices 105, 108 and 110 are shown as being communicatively connected to the network(s) 120 via respective wireless communication channels or links 122, 125, 128, and the stationary computing device 112 is shown as being connected to the network(s) via a respective wired communication link 130, although in some situations, a particular mobile device (e.g., the smart device 105) may be additionally or alternatively connected to the network(s) 120 via a wired connection. Similarly, the vehicle image data system 115 is communicatively connected to the network(s) 120 via one or more respective wired and/or wireless links or communication channels 132.

The vehicle image data system 115 is also communicatively connected to one or more other computing devices or systems 135, in some cases. For example, the vehicle image data system 115 is communicatively connected to the one or more other computing devices/systems 135 via a direct wired and/or wireless communication channel 138. Additionally or alternatively, the vehicle image data system 115 is remotely connected to another computing device/system 135 via the network 120 and the links 132, 140. The one or more other computing devices or systems 135 are configured to utilize at least some of the vehicle image data 118 to perform one or more functions. For example, the system 135 utilizes the vehicle image data 118 to generate an appraisal for vehicle damage, to estimate a cost of repair for a particular vehicle, to generate an insurance claim, to order or procure repair parts, and/or to perform any other function requiring vehicle image data. In an embodiment, the computing device 135 and one of the other computing devices 105-112 are an integral computing device. For instance, a laptop computer 110 may include both an instance of the vehicle image and label application 102 and one or more other applications (not shown) configured to perform functions that require vehicle images and/or image data that has been generated or captured and labeled by the application 102.

Figure 2:
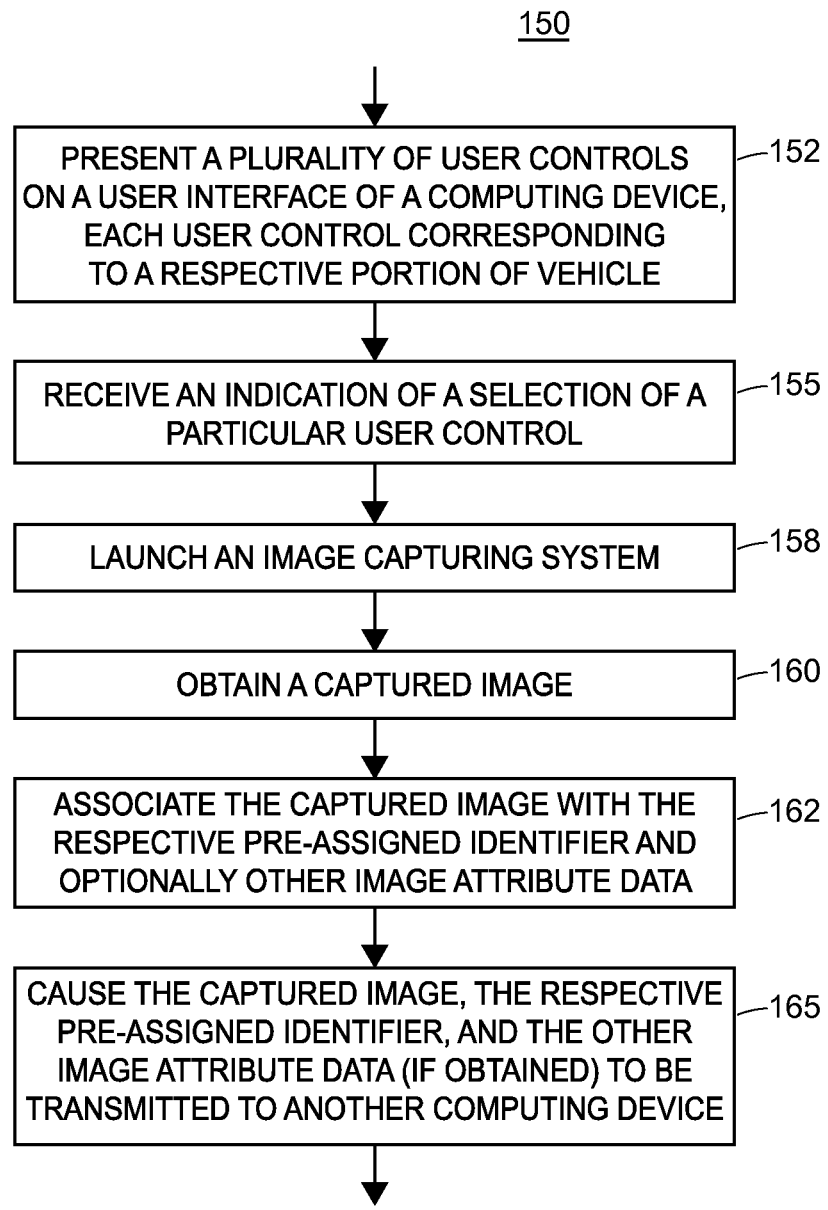
FIG. 2 illustrates an embodiment of a method for capturing and automatically labeling an image of a vehicle.

FIG. 2 is an embodiment of a method 150 for capturing and labeling vehicle images. At least a portion of the method 150 is performed, for example, by the system 100 of FIG. 1 or by some other suitable system. For example, a mobile computing device such as a smart phone or smart device 105, a tablet 108, a laptop 110, or other suitable mobile computing device may perform at least a portion of the method 150, and/or at least a portion of the method 150 may be performed by a stationary computing device 112. In an embodiment, the method 150 is performed by an application executing on a computing device, e.g., the application 102 of FIG. 1. For ease of discussion, the description of the method 150 is generally described below as being performed by the application 102 of FIG. 1. However, it is understood that at least a portion of the method 150 may be performed by other applications executing on a computing device on which the application 102 is resident, and/or at least a portion of the method 150 may be performed by one or more other computing devices.

At a block 152, a plurality of selectable user controls via which images are able to be captured is presented on a user interface of the computing device. Each user control corresponds to a different, respective portion, pose or view of a type of vehicle, and each user control also corresponds to a pre-assigned identifier that uniquely identifies the respective portion of the vehicle. Typically, the pre-assigned identifier is expressed in a computer-readable syntax (e.g., metadata or other constructed language, formal language, artificial language, or computer-executable language) that is not readily understood by a human being, e.g., that is not a natural language. As used herein, the term "natural language" refers to ordinary language or a language that arises in an unpremeditated fashion (e.g., naturally) as a result of the innate facility for language possessed by the human intellect. For example, Italian, Swahili, Japanese, and Braille are natural languages, where as C++, Java, and Lisp are not natural languages, i.e., C++, Java, and Lisp are computer-executable languages. The vehicle image data system 115 generates the plurality of pre-assigned identifiers and provides them to the application 102, for example.

Typically, a pre-assigned identifier is not presented on the user interface, as it is not of a natural language and would have little or no meaning to a human being. In some cases, though, a natural language translation of a pre-assigned identifier is presented on the user interface, e.g., as part of a particular user control or in some manner that indicates its correspondence to the particular user control. This natural language identifier may be pre-established and fixed by the program supplier or may be able to be set by the user during a configuration stage of the program. However set, the natural language identifier and possibly the pre-assigned identifier connected thereto, is generally fixed during operation of the program, i.e., when the user is taking various photos or images of a vehicle. Of course, if desired, the pre-assigned identifier may be equivalent to or the same as the natural language identifier provided to the user on the screen.

Additionally, as generally used herein, a non-natural language identifier of a particular vehicle portion is "pre-assigned" when the identifier is assigned by a user of the computing device or the program provider or others prior to the operation of the image capture portion of the application and is thus available a priori. That is, the user does not need to enter information at the computing device that corresponds to the particular vehicle portion when taking the photo. Rather, each selectable user control is pre-assigned a respective identifier that is indicative of a particular portion of a vehicle prior to the presentation of the user controls at the user interface (block 152). For example, the application 102 executing on the computing device that presents the user controls 152 is configured with the set of pre-assigned identifiers for respective portions, poses or views of the vehicle, or the set of pre-assigned identifiers is made available (e.g., downloaded, able to be accessed at, etc.) by the vehicle image data system 115 for use by the application 102. In an embodiment, a user of the vehicle image data system 115 may define one or more of the pre-assigned attributes that are to be made available to one or more applications 102.

Figure 3:
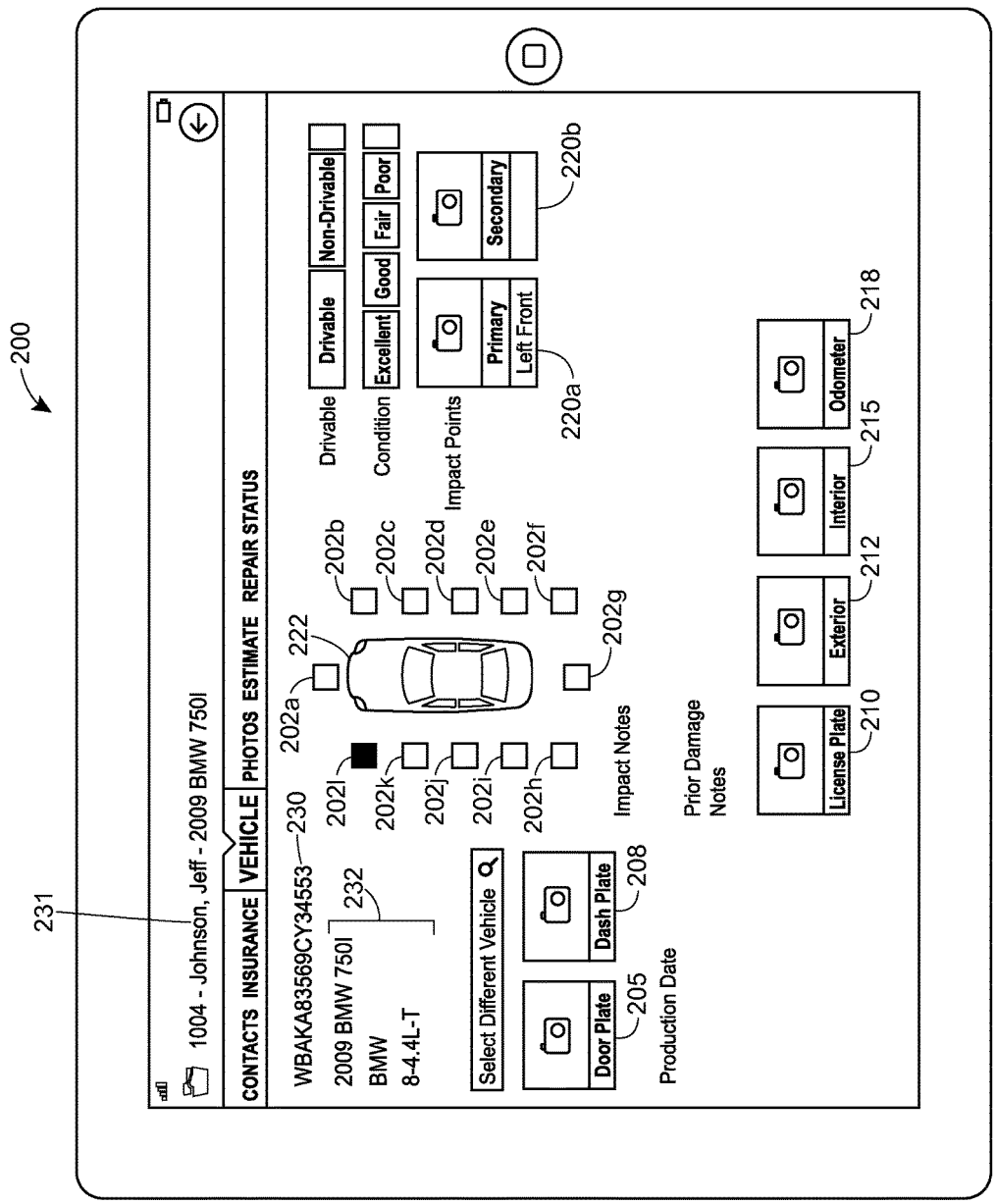
FIG. 3 is an example screen presented at a computing device for capturing and automatically labeling images of a vehicle.

To illustrate examples of presenting the plurality of user controls 152, FIG. 3 includes an example screen 200 of a user interface of a tablet computing device on which a plurality of user controls 202-220, e.g., selectable user controls 202-220, are presented. Each of the user controls 202-220 corresponds to a different portion of a vehicle. Some of the controls (e.g., the controls 202a-202l) are positioned on the screen 200 around a generalized vehicle representation 222 in locations that indicate respective portions, poses or views of a vehicle. For example, the control 202a corresponds to the front center of a vehicle, and the control 202i corresponds to the left rear quarter panel or post of a vehicle. Some of the controls presented on the screen 200 (e.g., the controls 205-220) include a respective natural language translation of the respective pre-assigned identifier indicative of a respective portion of a vehicle to which the control corresponds. For example, the control 208 includes the natural language text "Dash Plate," and the control 210 includes the natural language text "License Plate." Other natural language syntaxes other than words (not shown) may be used as natural language translations, such as abbreviations (e.g., "DP" for Dash Plate, "RFF" for right front fender) or numbers or tags (e.g., "1," "2," "3" or "53-A," "53-B," "53-C").

Returning to the method 150, at a block 155, an indication of a selection of a particular user control is received. For example, a mouse click or a touch corresponding to a particular user control is detected or received. Moreover, one or more of the user controls may be activated by a "voice" invocation. Here, the user may press a button or activate a generic visual control icon on the screen (either of which may in this case be the user control) to indicate that the user is about to provide a voice activated user control. Thereafter, the user may say "Front left" which would launch the camera to capture the photo. A voice recognition application within the computing device would of course detect the voice command and decode it as being indicative of one of pre-set or available user controls. If the voice recognition application was unable to decode the voice command to a particular user control, the voice recognition application may provide an indication of such to the user via the computing device, such as on the screen of the device or via a voice instruction. On the other hand, if desired, the voice recognition application could simply assign the decoded words as the identifier to be used in identifying the pose of the photo. At block 158, an image capturing system (e.g., a camera or other suitable image capturing system, device or apparatus) is launched or activated. In an embodiment, an image capturing system included in or on the computing device, such as a camera application, is launched. Alternatively, the computing device causes an external image capturing system (e.g., the camera 113) to be launched or be activated, e.g., by transmitting an instruction to the external image capturing system.

In an embodiment, the launch of the image capturing system (block 158) is triggered by the received selection of the particular user control (block 155). In another embodiment, the image capturing system 158 is first launched, and then the selection of a user control is received 155, for example, when the presentation of the plurality of user controls (block 152) is overlaid or superimposed on a window or view finder presented by the image capturing system at the user interface of the computing device.

At a block 160, an image captured by the launched image capturing device is obtained. For example, an integral camera application on the computing device captures an image in response to a user command, or the computing device receives a captured image from an external image capturing device.

At a block 162, the obtained, captured image is associated with the pre-assigned identifier that corresponds to the selected, particular user control (block 165). That is, the captured image is associated with the pre-assigned identifier indicative of the respective portion of the vehicle. For example, an indication of the pre-assigned identifier is stored in a data file in which the captured image is contained, or an indication of the pre-assigned identifier is stored as metadata corresponding to the captured image. In some embodiments, other image attribute data (e.g., VIN or other vehicle identification information, geo-spatial location, vehicle owner identifier, time/date of image capture, and/or other information) is associated with the captured image.

At a block 165, the captured image and an indication of the associated, pre-assigned identifier (and indications of any other desired or requested image attribute data) is caused to be transmitted to a data storage system or to another computing device. For example, the captured image and the indication of the associated, pre-assigned identifier is transmitted to the data storage system 118, to the vehicle image data system 115, or to another computing device or system 135 using a communication interface of the computing device at which the captured image was obtained and automatically labeled, e.g., via a wired or a wireless communication interface.

Next, example scenarios of the method 150 are provided to illustrate the novel techniques and concepts included herein. The example scenarios are discussed with simultaneous reference to FIGS. 1 and 2 for ease of discussion but not for purposes of limitation.

In a first example scenario, a person (e.g., a field appraiser or an employee of a repair shop) uses an application 102 stored on a memory of a tablet computing device 108. Referring again to FIG. 3, when the user launches the application 102 stored on the tablet 108, the screen 200 including user controls 202-220 is presented at the touch screen (e.g., a user interface) of the tablet 108.

In this scenario, the VIN number 230 of the vehicle whose portion or portions are to be imaged (e.g., the "subject vehicle") has already been obtained and is displayed on the screen 200. For example, prior to the screen 200 being displayed, the user launched an integral image capturing apparatus of the tablet 108 and used the apparatus to capture an image of the VIN number 230 displayed on the subject vehicle, and an image processing application determined the VIN number 230 from the captured VIN number image. In another example, the user directly entered the VIN number of the subject vehicle at the user interface of the tablet 108.

An indication 231 of a vehicle owner, an authorized representative of the vehicle owner, or a person otherwise corresponding to the subject vehicle is displayed on the screen 200. For example, prior to the screen 200 being displayed, the user entered, at the user interface of the tablet 108, the name 231 of the vehicle owner, his or her authorized representative, or the person otherwise corresponding to the subject vehicle.

Additionally, an indication of the make, model and year 232 of the subject vehicle is displayed on the screen 200. In an example, the make, model and year 232 and/or other vehicle attributes are determined, by the application 102, from the VIN number of the subject vehicle. The generalized vehicle representation 222 and/or the set of user controls 202a-202l shown on the screen 200 may correspond to the make, model and/or year 232 of the subject vehicle, if desired. For example, if the subject vehicle is a 2009 BMW 750i sedan, the generalized vehicle representation 222 is visually recognizable on the screen 200 as generally corresponding to the body style of a 2009 BMW 750i, and the set of user controls 202a-202l surrounding the vehicle representation 222 is as shown in FIG. 3. However, if the subject vehicle is a 2012 Ford F-150 pick-up truck, the generalized vehicle representation 222 instead would be visually recognizable on the screen 200 as generally corresponding to the body style of a 2012 Ford F-150 pick-up truck, and additional user controls may surround the representation 222, as the 2012 Ford F-150 is a larger vehicle than the 2009 BMW 750i and may require additional images to capture all desired views of the subject vehicle.

In the screen 200, the user has selected the user control 202*l* corresponding to the "left front" of the subject vehicle. As a result, two windows or user controls 220*a*, 220*b* corresponding to the user control 202*l* are activated (as indicated by the highlighted controls 220*a*, 220*b*). As the user control 202*l* corresponds to a pre-assigned identifier indicative of the left front view of a vehicle, each child user control 220*a*, 220*b* of the user control 202*l* also corresponds to the pre-assigned identifier corresponding to the parent control 202*l*. Each child user control 220*a*, 220*b* also includes a natural language translation of the pre-assigned identifier (i.e., the text string "left front") to aid the user. It is noted that while FIG. 3 depicts two children user controls 220*a*, 220*b* corresponding to the parent user control 202*l*, any number of children user controls (e.g., zero, one, three or more children user controls) may correspond to a parent user control. In some embodiments, the user indicates a number of desired children user controls.

When the user activates the control 220*a*, a camera application of the tablet 108 is launched. The view finder or capture window of the camera application may be presented in within the boundaries of the user control 220*a*, or the view finder of the camera application may be expanded to cover a larger portion of or the entire screen 200. In any case, the user aims the tablet 108 so that the left front portion of the subject vehicle is visible in the view finder of the camera application, and instructs the camera application to capture an image of the view finder contents. Consequently, an image (ostensibly of the left front of the subject vehicle) is captured and is automatically labeled with the pre-assigned identifier associated with the user control 220*a*. For example, the captured image is automatically associated with the pre-assigned identifier indicative of the left front of a subject vehicle, or metadata corresponding to the pre-assigned identifier is automatically added to the captured image.

In some cases, one or more other image attributes or image labels are also obtained and/or associated with the captured image. For example, data indicating the VIN 230 and/or the make/model/year 232 of the subject vehicle is associated with the captured image. Additionally or alternatively, data indicating the geo-spatial location at which the captured image was taken may be associated with the captured image, e.g., a GPS transceiver of the tablet 108 provides the geo-spatial location to the application 102, and the application 102 converts the geo-spatial location to metadata associated with the captured image. Still additionally or alternatively, data indicating a time and date of capture of the image may be associated with the captured image, e.g., a clock function of the tablet 108 provides a time stamp or other similar data to the application 102, and the application 102 converts the time/date stamp or similar to metadata associated with the captured image. In some cases, data indicating the person 231 associated with the subject vehicle is included in the image attribute data corresponding to the captured image, e.g., as metadata.

The captured image and its image attribute data are stored in a memory of the tablet 108. After all desired images have been captured and automatically labeled (e.g., by sequentially activating the desired user controls), the user instructs the application 102 to transmit the captured images and corresponding image attribute data from the tablet 108 to the vehicle image data system 115. In response, the application 102 compresses the captured images and corresponding image attribute data, and transfers the compressed information to the vehicle image data system 115 by using a wireless or wired communication interface of the tablet 108. In turn, the vehicle image data system 115 receives the captured images and corresponding image attribute data, and causes the captured images and corresponding image attribute data to be stored, for example, in the vehicle image data storage entity 118, so that the stored information is accessible to other applications and devices, e.g., a vehicle repair cost estimating application executing on the computing device 135.

In some cases, the tablet 108 includes one or more other applications that utilize the vehicle image data. In these cases, the other applications simply access the vehicle image data that is locally stored at the tablet 108.

Figure 4:
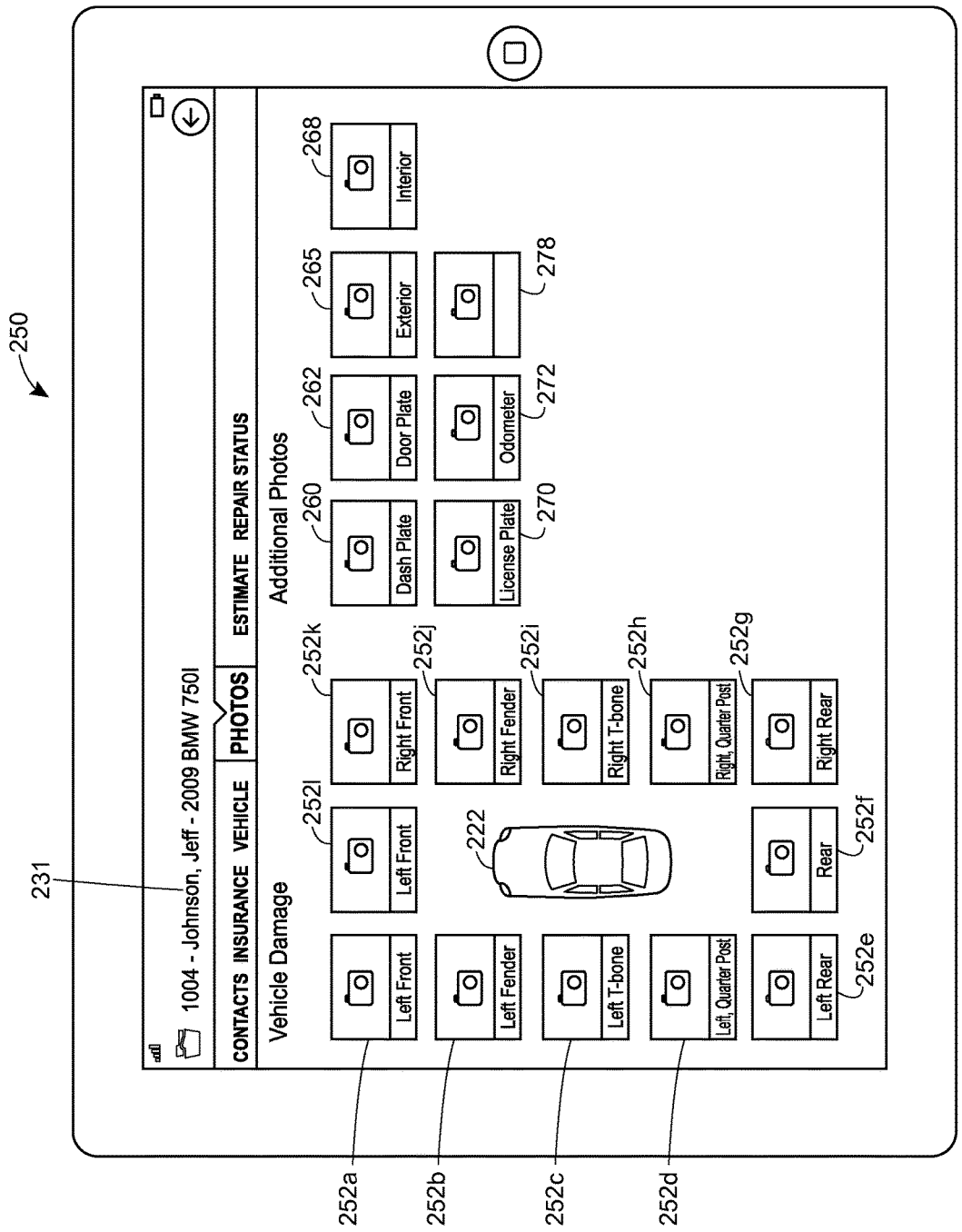
FIG. 4 is an example screen presented at a computing device for capturing and automatically labeling images of a vehicle.

Of course, the screen 200 of FIG. 3 is only one of numerous examples of arrangements, configurations and contents of the plurality of user controls for capturing and automatically labeling images. FIG. 4 illustrates another example of a screen or display arrangement 250 via which images are able to be captured and automatically labeled. The screen 250 may be presented on a tablet computing device 108, a laptop 110, or a stationary computing device 112, for example. On the screen 250, each user control 252*a*-252*l* surrounding the generalized vehicle representation 222 includes a respective natural language translation of the pre-assigned identifier corresponding to the respective portion, pose or view of a vehicle. Other controls 260-272 are also included on the screen 250. The screen 250 further includes a user control 275 to capture an additional image for which a natural language label 278 is able to be defined by the user, e.g., via the user interface of the tablet 108. For example, the user controls 252*a*-252*l* and 260-272 are a standard set of user controls corresponding to a standard set of vehicle views that are desired or required to be captured, and the user control 275 allows an additional image to be added to the standard set of captured images. The user may indicate an existing natural language label that is to be applied to the additional image (e.g., the additional image is another picture of the "Left T-bone" view 252*c*), or the user may define a custom natural language label for the additional image (e.g., "muffler"). The custom natural language label may be assigned a respective identifier in the computer-executable language, and the identifier corresponding to the custom natural language label may be included in any obtained or captured image attribute data corresponding to the additional image that is transmitted from the computing device.

In an embodiment, a standard set of user controls to be displayed on the screen 300 (or on any screen presenting the plurality of selectable user controls for capturing images and automatically labeling the captured images) is at least partially defined by a user. For example, an insurance company may define a template or portions of a template that presents a required set of images that the company requires to be taken to record vehicle damage. The required set may vary for different situations, e.g., for different make/model/years of subject vehicle, or for different states or jurisdictions in which insurance is provided. In another example, a repair shop defines at least a portion of a first template to be used when a person comes in for an estimate to repair a vehicle, and defines at least a portion of a second template to be used when repairs have been completed and the repair shop desires to visually document the finished repair work.

Figure 5A:
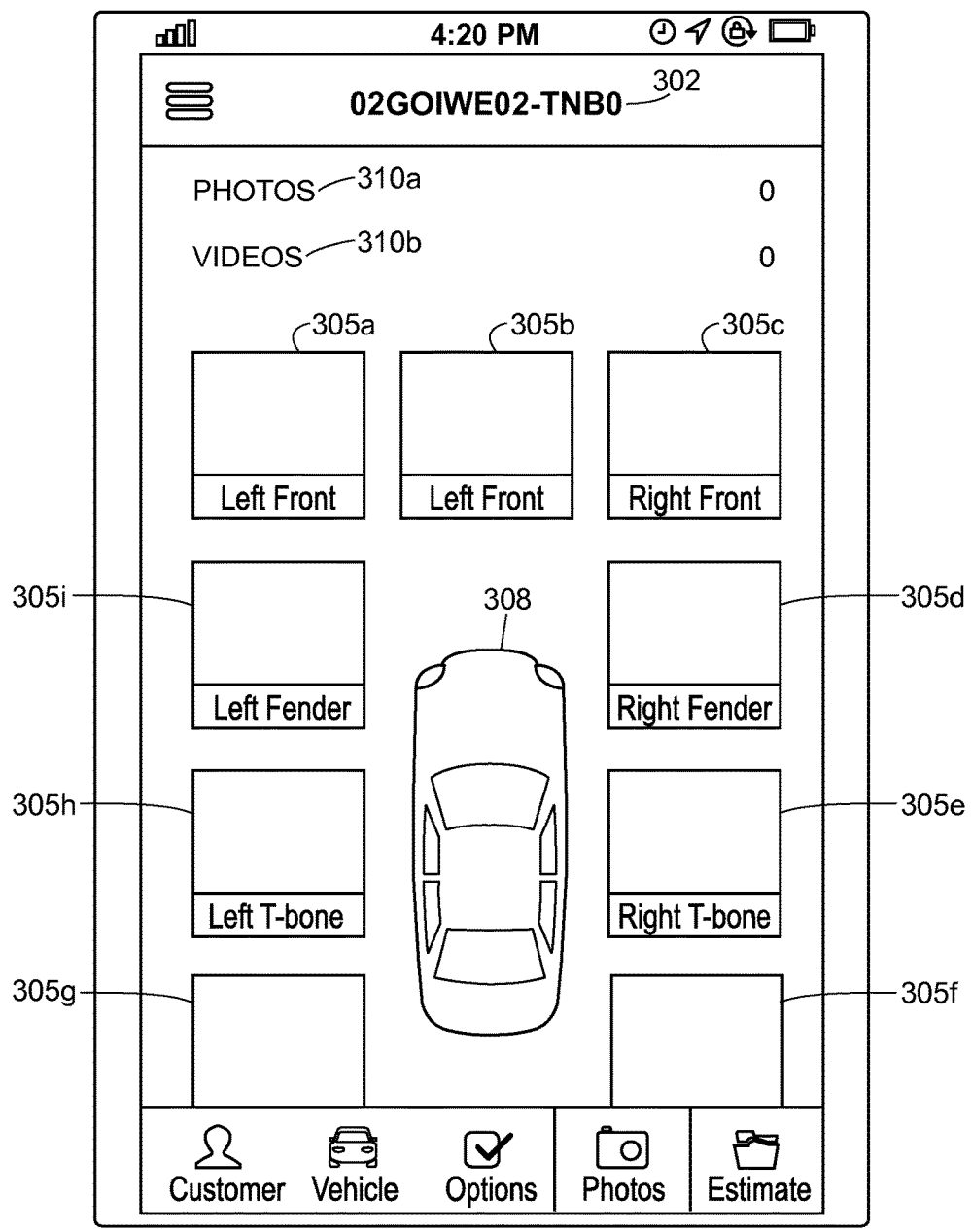
FIGS. 5A and 5B illustrate an example screen presented at a computing device for capturing and automatically labeling images of a vehicle at different moments in time.
Figure 5B:
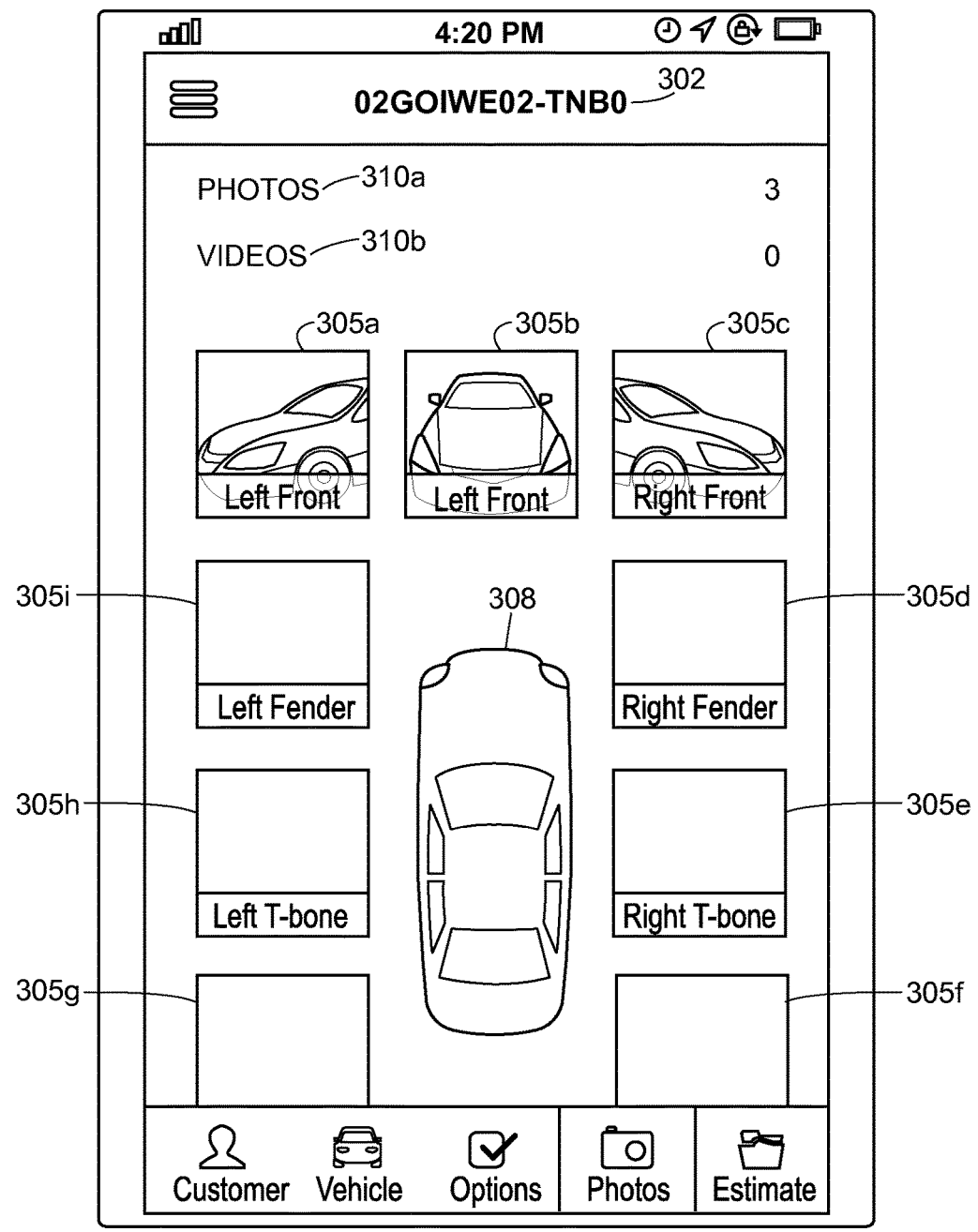

FIGS. 5A and 5B illustrate a screen 300 for capturing images and automatically labeling the captured images that is presented on a mobile phone or smart device 105. The screen 300 includes the VIN number 302 of the subject vehicle, which has already been obtained in a manner such as previously described above. The screen 300 also includes a plurality of user controls 305a-305i surrounding a generalized vehicle representation 308. Each user control 305a-305i includes a respective natural language translation of the pre-assigned identifier corresponding to the respective portion, pose or view of a vehicle. In FIG. 5A, no images of a subject vehicle have yet been captured.

In FIG. 5B, three images of the subject vehicle have been captured as a result of activation of user controls 305a, 305b and 305c. The captured images are displayed on the screen 300 in the corresponding user controls 305a, 305b and 305c along with their respective natural language labels.

In addition to still images 310a, FIGS. 5A and 5B indicate that a user may capture video or moving images 310b. For example, if a user activates the user control 305e corresponding to the "Right T-Bone" view, the camera window or view finder includes a user control to allow the user to choose whether he or she desires to take a still picture or a moving image. The still or dynamic captured image is stored in conjunction with the user control 305e and its pre-assigned identifier, in a manner such as previously discussed.

Of course, any of the contents, techniques, and/or concepts discussed above with respect to screens 200, 250 and 300 may be individually applied or applied in combination at a computing device on which an application 102 for capturing images and automatically labeling the captured images resides.

Figure 6:
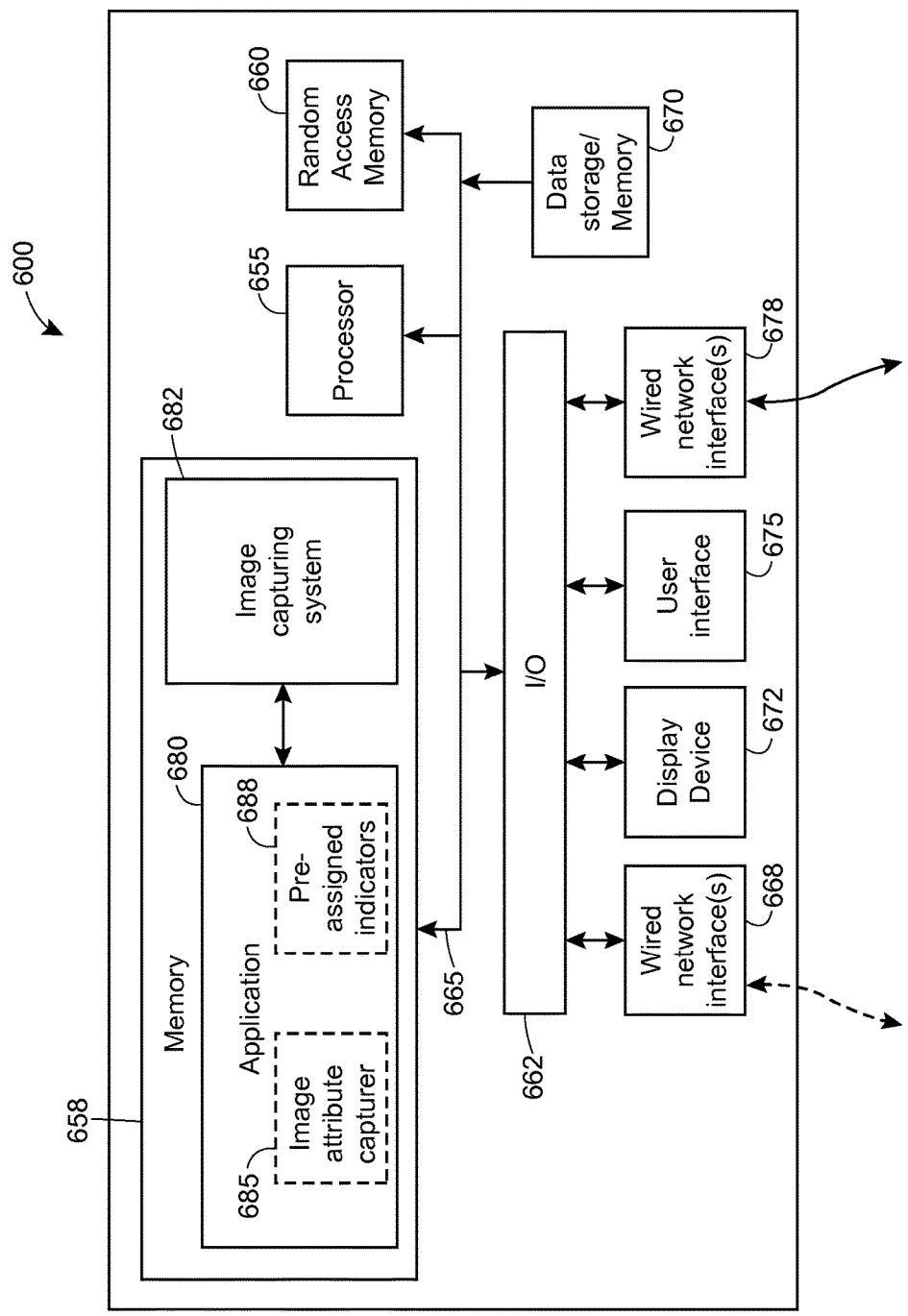
FIG. 6 is a block diagram of an example computing device at which images are captured and automatically labeled.

FIG. 6 illustrates a block diagram of an example computing device 600 which may operate in accordance with any of (and/or any one or more portions of) the systems, methods, techniques and concepts discussed herein. The computing device 600 is, for example, a smart phone, a smart device, a laptop, a tablet, or any other communications or computing devices, such as one of the devices 105-112 discussed with respect to FIG. 1.

The computing device 600 includes a processor 655 (may be called a controller, microcontroller or a microprocessor, in some embodiments) for executing computer-executable instructions, a program memory 658 for permanently storing data related to the computer-executable instructions, a random-access memory (RAM) or other suitable memory 660 for temporarily storing data related to the computer-executable instructions, and an input/output (I/O) circuit or component 662, all of which are interconnected via an address/data bus or suitable bus 665. As used herein, the terms "computer-executable instructions," "computer executable instructions," "computer-readable instructions," and "instructions" are used interchangeably.

The computing device 600 may include one or more wireless interfaces 668 via which the computing device 600 wirelessly connects with one or more respective networks or devices using a wireless communications channel or link. For example, the computing device 600 communicatively connects to a wireless Local Area Network (LAN) using a wireless Ethernet protocol over one of the wireless interfaces 668. Additionally or alternatively, the computing device 600 communicatively connects to a network or device using a Near Field Communications (NFC) protocol (e.g., Bluetooth) over one of the wireless interfaces 668. In some embodiments, the computing device 600 includes one or more cellular wireless interfaces 678 to support communications over respective cellular radio frequency (RF) bands, e.g., AMPs, TDMA, CDMA, GSM, PCS, 3G, 4G, 5G, and/or other cellular radio frequency band. Generally, the one or more local wireless interfaces 668 may support any suitable radio frequency band, and the one or more local wireless interfaces 668 include one or more corresponding transceivers.

The computing device 600 may include one or more wired interfaces 678 via which the computing device 600 connects with one or more respective networks or devices using a wired communications channel or link. For example, the computing device 600 communicatively connects to an Ethernet network, a broadband packet network, or to a USB device using the one or more wired interfaces 678. Generally, the one or more wired interfaces 678 may support any suitable wired communications technology.

With further regard to FIG. 6, it should be appreciated that although only one processor 655 is shown, the computing device 600 may include multiple processors 655. Similarly, the memory of the device 600 may include multiple RAMs (Random Access Memories) 660, multiple program memories 658, and/or one or more other data storage entities or types of memories 670. The RAM(s) 660, program memories 658, and/or the data storage entities 670 may be implemented as one or more semiconductor memories, magnetically readable memories, optically readable memories, biological memories, and/or other tangible, non-transitory computer-readable storage media, for example.

Furthermore, although the I/O circuit 662 is shown as a single block, it should be appreciated that the I/O circuit 62 may include a number of different types of I/O circuits or connections. In an example, a first I/O circuit corresponds to a display device 672, and the first or a second I/O circuit corresponds to a user interface 675. The user interface 675 may be, for example, a dial, a set of buttons or keypad, a touch screen or touch pad, a voice activation device or devices (e.g., microphone and speaker), or any other known user interface device. In some embodiments, the display device 672 and the user interface 675 are jointly incorporated in a single or integral physical device. The computing device 600 may also include other elements common to general purpose computing devices (not shown).

The computing device 600 includes an application 680 that comprises computer-executable electronic instructions 680 executable to cause the device 600 to obtain or capture an image of a subject vehicle, and to automatically label the captured image. For instance, the computer-executable instructions 680 are an instance of the application 102 of FIG. 1. The instructions 680 interface with an image capturing system 682, in an embodiment. The image capturing system 682 may include an image capturing apparatus integrated into the computing device 600, and/or the image capturing system 682 may include an interface to an external image capturing apparatus. In this case, the image capturing system 682 is configured to receive a captured image from the external image capturing apparatus.

The instructions 680 include an image attribute capturer 685. In an embodiment the image attribute capturer 685 is configured to, when executed by the processor 655, to perform at least some of the method 150 of FIG. 2 and/or other methods described herein. In an embodiment, the image attribute capturer 685 obtains a captured image from the image capturing system 682, and causes the captured image and data indicative of one or more image attributes corresponding to the captured image to be transmitted to the vehicle image data system 115. In some cases, the image attribute capturer 685 obtains or acquires at least some of the image attributes. For example, the image attribute capturer 685 obtains GPS data corresponding to the captured image from a GPS transceiver that is integral with or communicatively coupled to the computing device 600 (not shown), and/or the image attribute capturer 685 obtains a date/time stamp corresponding to the captured image from a clock that is integral with or communicatively coupled to the computing device 600 (not shown).

The instructions 680 include a set of pre-assigned identifiers 688 that each correspond to a different respective portion, pose or view of a vehicle. As previously discussed, the pre-assigned identifiers 688 are expressed in a computer-executable language and not expressed in a natural language. The pre-assigned identifiers 688 are defined by the vehicle image data system 115, in an embodiment. The definitions of the pre-assigned identifiers 688 are stored in the vehicle image data storage entity 118, in an embodiment. In some cases, the instructions 680 also include a set of natural language translations of at least a portion of the set of pre-assigned identifiers 688. At least some of the natural language translations are defined by the vehicle image data system 115, and the definitions of the natural language translations are stored in the vehicle data storage entity 118, in an embodiment. A user of the vehicle image data system 115 or of the vehicle data storage entity 118 may define or assign at least some of the pre-assigned identifiers that are to be provided or otherwise made available to the computer-executable instructions 680 of the computing device 600. In some scenarios, at least a portion of the pre-assigned identifiers or all of the pre-assigned identifiers are defined or assigned by the system 115.

The computer-executable instructions 680 may be configured to cause the computing device 600 to perform one or more portions of any of the methods described herein. The instructions 680 are stored on one or more tangible, non-transitory computer-readable storage media included in the computing device 600, such as on the memory 658 or on some other suitable memory. Furthermore, the instructions 680 are executable by one or more processors 655. The instructions 680 may be downloaded or otherwise delivered to the computing device 600 from another computing device. For example, the instructions 680 are received from the vehicle image data system 115 via the wireless interface 668 and/or the wired interface 678. In an embodiment, the instructions 680 may be downloaded or delivered to the computing device 600 based on a user request.

While the image capture system has been described herein as being performed to capture and label images related to vehicle damage, this image capture and labeling system could be used to capture and label images of any other subject or object for any other purpose, including for example, people or various body parts of people for medical diagnostics, clothes items for retail sales, real estate for use in creating virtual walk-throughs as typically provided in real estate marketing web-sites, etc. Of course, in each of these cases, the identifier may uniquely indicate the person, clothes item or home or other subject in the image (which includes photos and videos), and the pose data may specify the pose or portion of the subject within the image.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. It is also recognized that the specific approaches described herein represent but some of many possible embodiments as described above. Consequently, the claims are properly construed to embrace all modifications, variations and improvements that fall within the true spirit and scope of the invention, as well as substantial equivalents thereof. Accordingly, other embodiments of the invention, although not described particularly herein, are nonetheless considered to be within the scope of the invention.

What is claimed is:

1. A method of recording damage to a vehicle, the method comprising:
    presenting, at a user interface of a mobile computing device, a plurality of user controls, wherein each user control of the plurality of user controls indicates a respective portion of the vehicle and includes a pre-assigned identifier that (a) is expressed in a non-natural language, the non-natural language being a computer-readable language having a particular syntax and format, (b) identifies the respective portion of the vehicle, and (c) is not presented on the user interface, and the plurality of user controls is a specific template of a plurality of templates of user controls, each template of the plurality of templates defined to meet a different set of jurisdictional requirements;
    receiving, at the user interface of the mobile computing device, a selection of a particular user control included in the plurality of user controls, the selected, particular user control indicative of a particular portion of the vehicle, the particular portion of the vehicle excluding a Vehicle Identification Number (VIN) or other unique identifier of the vehicle;
    launching an image capturing system of the mobile computing device;

obtaining a first image of the Vehicle Identification Number (VIN) or other unique identifier of the vehicle, the first image captured by the image capturing system;

image processing the first image to identify the VIN or other unique identifier of the vehicle;

obtaining a second image of the particular portion of the vehicle indicated by the selected, particular user control, the second image captured by the image capturing system; and causing the captured second image and metadata indicative of attributes corresponding to the captured second image to be transmitted to a data storage system that is configured to store information corresponding to vehicle damage, the attributes corresponding to the captured second image including (i) the pre-assigned identifier corresponding to the particular user control and to the particular portion of the vehicle, and (ii) the identified VIN or other unique identifier of the vehicle, thereby labeling the captured second image of the particular portion of the vehicle with the pre-assigned identifier corresponding to the particular portion of the vehicle and with the identified VIN or other unique identifier of the vehicle.

2. The method of claim 1, wherein:
the method further comprises obtaining the attributes corresponding to the captured second image; and
the attributes further include at least one of: a time of capture of the second image, a date of capture of the second image, or a geospatial location at which the second image was captured.

3. The method of claim 1, wherein presenting, at the user interface, the plurality of user controls comprises presenting, at the user interface, at least one natural language translation of at least one pre-assigned identifier of at least one user control.

4. The method of claim 3, wherein the at least one respective natural language translation includes a particular respective natural language translation of the pre-assigned identifier corresponding to the particular user control, and wherein the method further comprises displaying, on the user interface, an indication of the captured second image associated with the particular natural language translation.

5. The method of claim 3, further comprising receiving a definition of at least one of the at least one natural language translation via the user interface of the mobile computing device.

6. The method of claim 5, further comprising transmitting the definition of the at least one of the at least one natural language translation to the data storage system for storage.

7. The method of claim 1, wherein presenting the plurality of user controls corresponding to the plurality of respective portions of the vehicle comprises presenting a specific user control corresponding to a portion of the vehicle displaying the vehicle identification number (VIN) or other unique identifier of the vehicle.

8. The method of claim 7, wherein presenting the plurality of user controls corresponding to the plurality of respective portions of the vehicle further comprises presenting at least one other user control respectively corresponding to at least one other portion of the vehicle, the at least one other portion of the vehicle including at least one of:
a left front area of the vehicle;
a center front area of the vehicle;
a right front area of the vehicle;
a right fender of the vehicle;
a right side or T-bone area of the vehicle;
a right rear quarter post of the vehicle;
a right rear area of the vehicle;
a center rear area of the vehicle;
a left rear area of the vehicle;
a left rear quarter post of the vehicle;
a left side or T-bone area of the vehicle;
a left fender of the vehicle;
a hood of the vehicle;
a roof of the vehicle;
a door plate mounted on the vehicle;
an odometer of the vehicle;
a dash plate mounted on the vehicle;
a license plate of the vehicle;
another exterior portion of the vehicle; or
at least a portion of an interior of the vehicle.

9. The method of claim 1, wherein:
receiving the selection of the particular user control included in the plurality of user controls comprises receiving a selection of two or more particular user controls included in the plurality of user controls;
obtaining the second image comprises obtaining two or more images captured by the image capturing system and respectively corresponding to the two or more particular user controls; and
causing the captured second image and the metadata indicative of the attributes corresponding to the captured second image to be transmitted to the data storage system comprises causing the two or more captured images and respective metadata indicative of respective attributes corresponding to each of the two or more captured images to be transmitted to the data storage system.

10. The method of claim 1, wherein receiving, at the user interface of the mobile computing device, the selection of the particular user control included in the plurality of user controls includes receiving a voice command and, using a processor, decoding the voice command as being associated with a particular user control to determine the selection of the particular user control.

11. The method of claim 1, wherein the method is at least partially performed by a processor of the mobile computing device executing computer-executable instructions stored on a tangible, non-transitory computer-readable storage medium of the mobile computing device, and the method further comprises:
receiving the computer-executable instructions via a communication interface of the mobile computing device; and
storing the computer-executable instructions on the tangible, non-transitory computer-readable storage medium of the mobile computing device.

12. The method of claim 1, wherein causing the captured second image and the metadata indicative of the attributes corresponding to the captured second image to be transmitted to the data storage system comprises causing the captured second image and the metadata indicative of the attributes corresponding to the captured second image to be transmitted to the data storage system using a wireless communication interface of the mobile computing device.

13. The method of claim 1, further comprising obtaining the plurality of pre-assigned identifiers via a communication interface of the mobile computing device, wherein the plurality of pre-assigned identifiers is provided by the data storage system, and wherein the communication interface of the mobile computing device is connected, via a communication channel, to the data storage system or to another computing device.

14. The method of claim 1, further comprising receiving a user indication specifying a least a portion of the plurality of user controls that are to be presented for selection at the user interface.

15. The method of claim 1, further comprising generating an estimate of a repair cost of the vehicle based on the captured second image and the attributes corresponding to the captured second image.

16. The method of claim 1, wherein each template corresponds to a respective make of vehicles, a respective model of vehicles, and/or a respective year.

17. The method of claim 1, wherein each template is further defined to meet a respective set of requirements governed by a respective application that operates on labeled images.

18. The method of claim 1, wherein each template is further defined to meet a respective set of situational requirements.

19. A system for recording damage to a vehicle, the system comprising:
   an image attribute capturer, the image attribute capturer comprising one or more tangible, non-transitory memories storing computer-executable instructions that, when executed by one or more processors, cause the system to:
   present, at a user interface, a plurality of user controls, wherein each user control of the plurality of user controls indicates a respective portion of the vehicle and includes a pre-assigned identifier that (a) is expressed in a non-natural language, the non-natural language being a computer-readable language having a particular syntax and format, (b) identifies the respective portion of the vehicle, and (c) is not presented on the user interface, and the plurality of user controls is a specific template of a plurality of templates of user controls, each template of the plurality of templates defined to meet a different set of jurisdictional requirements;
   receive a first captured image of a Vehicle Identification Number (VIN) or other unique identifier of the vehicle;
   image-process the first captured image to determine the VIN or other unique identifier of the vehicle;
   receive, at the user interface, a selection of a particular user control included in the plurality of user controls, the selected, particular user control indicative of a particular portion of the vehicle from which the VIN or other unique identifier of the vehicle is excluded;
   receive a second captured image of the particular portion of the vehicle corresponding to the selected, particular user control; and
   cause the second captured image and metadata indicative of attributes corresponding to the second captured image to be transmitted to a data storage system that is configured to store information corresponding to vehicle damage, the attributes corresponding to the second captured image including (i) the pre-assigned identifier corresponding to the particular user control and the particular portion of the vehicle, and (ii) the identified VIN or other unique identifier of the vehicle, thereby labeling the captured second image of the particular portion of the vehicle with the pre-assigned identifier corresponding to the particular portion of the vehicle and with the identified VIN or other unique identifier of the vehicle.

20. The system of claim 19, further comprising a communicative connection to an imaging apparatus, and wherein the first captured image and the second captured image are captured by the imaging apparatus.

21. The system of claim 19, wherein the image attribute capturer includes further computer-executable instructions stored on the one or more tangible, non-transitory memories that, when executed by the one or more processors, cause the system to:
   obtain one or more other attributes corresponding to the second captured image, the one or more other attributes including at least one of: an indication of the time of capture of the second image, a date of capture of the second captured image, or an indication of a geospatial location at which the second captured image was captured; and
   cause metadata indicative of the one or more other attributes corresponding to the second captured image to be transmitted to the data storage system in conjunction with the second captured image.

22. The system of claim 21, further comprising means for obtaining the one or more other attributes, wherein the means for obtaining the one or more other attributes includes at least one of: a communicative connection to a Global Positioning Satellite System (GPS) device, or a communicative connection to a clock.

23. The system of claim 19, wherein the computer-executable instructions are downloaded from the data storage system via the communications interface for storage in the one or more tangible, non-transitory memories, and the plurality of pre-assigned identifiers is provided by the data storage system.

24. The system of claim 19, wherein each pre-assigned identifier comprises metadata identifying the respective portion of the vehicle.

25. The system of claim 19, wherein the data storage system is in communicative connection with at least one other system, the at least one other system is configured to perform a function, and the function includes at least one of: generate vehicle damage appraisals, generate insurance claims for vehicles, generate vehicle repair estimates, or store information corresponding to vehicle repairs.

26. The system of claim 25, wherein the function performed by the at least one other system is based on a set of rules, and wherein at least a portion of the set of rules is based on at least one of the second captured image or the attributes corresponding to the second captured image.

27. The system of claim 19, wherein the computer-executable instructions, when executed by the one or more processors, further cause the system to generate at least one of a vehicle damage appraisal, an estimate of a cost to repair the vehicle, or an insurance claim corresponding to the vehicle based on the second captured image and the attributes corresponding to the second captured image.

28. The system of claim 19, wherein the plurality of respective portions of the vehicle includes more than one of:
   a particular portion of the vehicle on which the vehicle identification number (VIN) or other unique identifier of the vehicle is displayed;
   a left front area of the vehicle;
   a center front area of the vehicle;
   a right front area of the vehicle;
   a right fender of the vehicle;
   a right side or T-bone area of the vehicle;
   a right rear quarter post of the vehicle;
   a right rear area of the vehicle;
   a center rear area of the vehicle;
   a left rear area of the vehicle;
   a left rear quarter post of the vehicle;

a left side or T-bone area of the vehicle;
a left fender of the vehicle;
a hood of the vehicle;
a roof of the vehicle;
a door plate mounted on the vehicle;
an odometer of the vehicle;
a dash plate mounted on the vehicle;
a license plate of the vehicle;
another exterior portion of the vehicle; or
at least a portion of an interior of the vehicle.

29. The system of claim 19, wherein at least one of the plurality of user controls presented on the user interface is selected, by a user of the system, to be presented on the user interface.

30. The system of claim 19, wherein the second captured image is indicated, at the user interface, as corresponding to a natural language translation of the pre-assigned identifier corresponding to the particular user control.

31. The system of claim 19, wherein the image attribute capturer, the user interface, and the one or more processors are included in a mobile communications device, and wherein the second captured image and the metadata indicative of the attributes are caused to be transmitted to the data storage system via a wireless communications interface of the mobile communications device.

32. The system of claim 19, wherein at least one user control of the plurality of user controls includes a respective natural language translation of the pre-assigned identifier corresponding to the at least one user control.

33. The system of claim 32, wherein the at least one respective natural language translation comprises a plurality of respective natural language translations; and
    wherein at least one of the plurality of respective natural language translations is defined via the user interface and at least another one of the plurality of respective natural language translations is provided by the data storage system.

34. The system of claim 19, wherein the image attribute capturer when executed by one or more processors, causes the system to receive, at the user interface, the selection of the particular user control included in the plurality of user controls by receiving a voice command and, using the one or more processors, decoding the voice command as being associated with the particular user control to determine the selection of the particular user control.

35. The system of claim 19, wherein at least one of:
    each template corresponds to a respective make of vehicles, a respective model of vehicles, and/or a respective year of vehicles; or
    each template is further defined to meet a respective set of situational requirements.

36. A method of creating an electronic image of a subject, the method comprising:
    presenting, via a user interface of a mobile computing device having a computer processor, a plurality of user controls, wherein each user control of the plurality of user controls corresponds to a respective portion of the subject, the plurality of user controls is a specific template of a plurality of templates of user controls, and each template of the plurality of templates is defined to meet a different set of jurisdictional requirements;
    receiving, via the user interface of the mobile computing device interacting with the computer processor, a selection of a particular user control included in the plurality of user controls, the selected, particular user control indicative of a particular portion of the subject from which a unique identifier of the subject is excluded;
    launching, using the computer processor, an image capturing system on the mobile computing device;
    receiving, using the computer processor, a first electronic image of the unique identifier of the subject, the first electronic image captured by the image capturing system;
    image processing, using the computer processor, the first electronic image to determine the unique identifier of the subject;
    receiving, using the computer processor, a second electronic image captured by the image capturing system and including an image of the particular portion of the subject corresponding to the selected, particular user control; and
    causing, using the computer processor, the captured second electronic image and metadata indicative of attributes corresponding to the captured second electronic image to be stored in a data storage system, the attributes corresponding to the captured second electronic image including (i) a pre-assigned identifier that corresponds to the selected, particular user control and identifies the particular portion of the subject, is expressed in a non-natural language that is a computer-readable language having a particular syntax and format, and is not presented on the user interface of the mobile computing device, and (ii) the determined unique identifier of the subject, thereby automatically labeling the captured second electronic image with the pre-assigned identifier corresponding to the particular portion of the subject and with the unique identifier of the subject.

37. The method of claim 36, further comprising receiving the attributes corresponding to the captured second electronic image at a time of capture of the second electronic image; and
    wherein the attributes further include at least one of: the time of day of capture of the captured second electronic image, a date of capture of the captured second electronic image, or a geospatial location at which the second electronic image was captured.

38. The method of claim 36, wherein corresponds to a respective make, a respective model, and/or a respective year of subjects.

39. The method of claim 38, wherein each template is further defined to at least one of: meet a respective set of requirements governed by a respective application that operates on labeled images, or meet a respective set of situational requirements.

* * * * *